United States Patent [19]

Vander Syde

[11] Patent Number: 4,486,013
[45] Date of Patent: Dec. 4, 1984

[54] ADAPTIVE VACUUM CUP MECHANISM
[75] Inventor: Gary L. Vander Syde, Naperville, Ill.
[73] Assignee: Bell & Howell Company, Chicago, Ill.
[21] Appl. No.: 409,235
[22] Filed: Aug. 18, 1982
[51] Int. Cl.³ .............................................. B65H 3/08
[52] U.S. Cl. ..................................... 271/107; 271/108
[58] Field of Search ......................... 271/107, 108, 103
[56] References Cited
U.S. PATENT DOCUMENTS

| 1,155,503 | 10/1915 | Moore . | |
| 1,395,232 | 10/1921 | Kronquest . | |
| 1,888,194 | 11/1932 | Broadmeyer . | |
| 2,392,403 | 1/1946 | Pechy . | |
| 2,995,360 | 8/1961 | Simpson | 271/107 |
| 3,087,722 | 4/1963 | Neuberger | 271/107 |
| 3,764,133 | 10/1973 | Gray | 271/107 X |
| 3,822,008 | 7/1974 | Benner | 271/108 X |
| 3,887,177 | 6/1975 | Farfaglia et al. | 271/12 |
| 4,210,320 | 7/1980 | Feldkamper | 271/108 |

Primary Examiner—Richard A. Schacher
Attorney, Agent, or Firm—Neal C. Johnson; Alan H. Haggard; Alan B. Samlan

[57] ABSTRACT

A vacuum cup mechanism with automatic venting means. A carriage member oscillates between a stack of documents and the main document transport means. A vacuum device mounted on the carriage has a flexible cup at one end and is connected to a vacuum source at the other end. The vacuum device has a body with an internal hollow chamber which is in fluid communication with the flexible cup and the vacuum source. The body rotates about a pivot point to control the operation of a valve which vents the vacuum at the vacuum cup when the document is placed into the main document transport.

16 Claims, 4 Drawing Figures

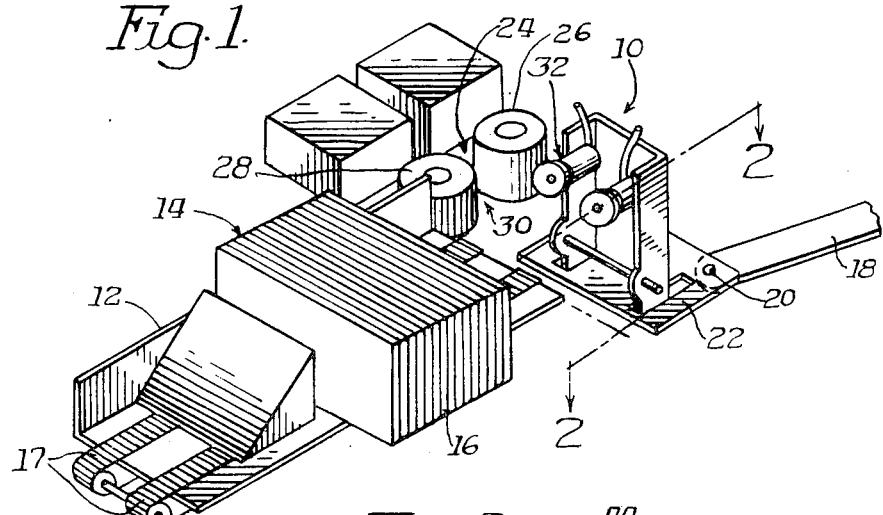
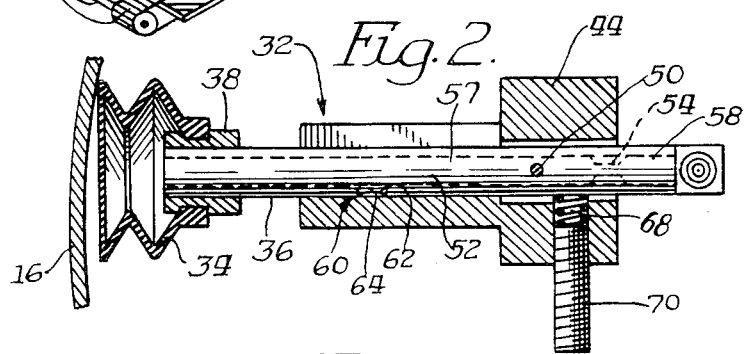
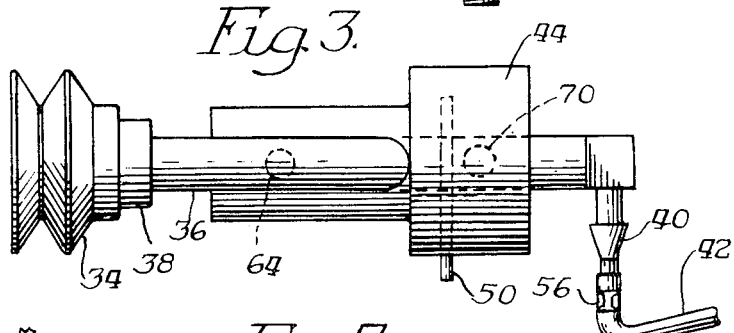
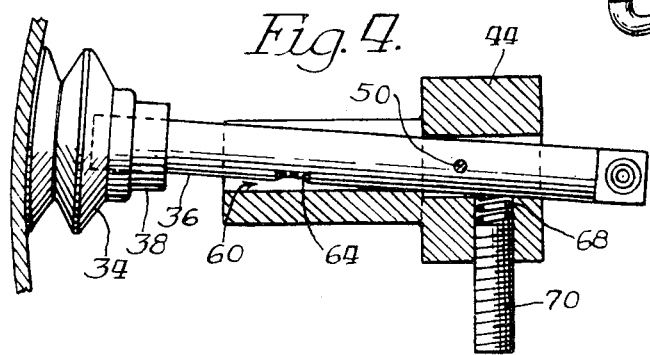

ADAPTIVE VACUUM CUP MECHANISM

BACKGROUND OF THE INVENTION

This invention relates to a device for feeding documents and more particularly to an improved vacuum cup feeder mechanism used in such a device.

The invention described below is particularly well suited and designed for use in document handling apparatuses such as mail handling and processing equipment. For example, as illustrated in U.S. Ser. No. 148,068 filed on May 12, 1980 entitled "Vacuum Document Feeder" there is illustrated an envelope feeding device which withdraws envelopes from a stack and places them into a main document transport or feeder which is comprised of a belt or drive roller system. The envelopes are weighed and sorted in the main document transport. The envelopes are pulled from the stack by means of a vacuum cup which is oscillated or reciprocated back and forth between the stack and the main document transport. The vacuum cup is designed to remove one envelope at a time and deliver that envelope to the transport system, typically with a speed and/or change of direction in the envelope.

Another example of a main transport system which can use the disclosed inventive device includes inserters which withdraw inserts from a stack by means of gripper jaws and places them on a raceway as illustrated in U.S. Pat. No. 3,306,606. Yet another type of main transport system is represented by automatic mail sorting machines wherein address envelopes are optically read and sorted according to zip code destinations. A characteristic of all of these drive systems is a positive, hard drive of the document to assure accurate positioning of the document into the transport system. Another characteristic is that it must be fully automatic and operate at high speeds to be economically efficient.

One problem with the prior art devices using vacuum cups occurs at the interface between the vacuum cup feeder and the main transport. As the vacuum cup must be able to separate a single envelope or document from a stack, the vacuum cup is generally made of soft accommodating material. This enables the vacuum cup to firmly seat against the document regardless of slight irregularities in the document or its misregistration as the vacuum cup mechanism can be moved quickly and positively against the document. After the document is withdrawn from the stack, it is placed into the main transport system. The vacuum must be released at precisely the instant that the document is fed into the main transport system to prevent damage to the vacuum cup as the document is pulled off of the cup and to prevent damage or excessive wear to the main transport system.

Typically, prior art devices have used a solenoid actuated vacuum valve coupled with a position sensor to release the vacuum to the vacuum cup at the proper instant in the document feeding cycle. Other similar devices have used cams and cam sensors to control the valve timing. Because the vacuum valve must be located remote from the vacuum cup due to its size and operation, a significant time delay occurs before the vacuum at the vacuum cup is reduced through the length of connecting tubing. With a variable speed feeder the higher the feed rate, the longer the time delay will be with respect to the feed cycle. At extremely high feed rates it is very difficult to time the valve and have the vacuum reduced at the cup quickly enough to allow the document to be easily pulled off the vaccum cup. If the vacuum is not sufficiently reduced there will still be a sufficient vacuum present to damage the cup and thereby reduce its useful life.

One solution has been to employ a registration surface to register the material stack for proper timing into the main transport. However, a problem with this is that misregistration will also cause the vacuum to be released at other than the optimum desired times. Also, for systems using pull out or nip rollers, material of greater thickness will be picked up by the rollers before the thinner material, causing further timing changes.

In order to compensate for all of the timing variables when feeding varying thicknesses and types of documents at varying speeds, prior devices had to compromise the feeder design in order to minimize wear. Furthermore, the use of solenoid valves and position sensors resulted in higher system costs and less reliable feeding.

SUMMARY

The present invention is directed to an improved paper feeding mechanism which avoids the above-mentioned problems by providing a vacuum feeding mechanism which removes documents from a stack and places them into a main document transport. The mechanism has a carriage which oscillates between the stack and the main document transport by means of conventionally used carriage transport systems. Mounted on the carriage is a vacuum device which has a flexible vacuum cup at one end and is connected at the other end to a vacuum source. The vacuum drive includes a housing and a tubular body mounted in the housing. The body of the vacuum device has an internal, hollow chamber which allows the vacuum from the vacuum source to be in fluid communication with the flexible cup. The body can pivot within the housing about a pivot point which operates a valve on the body. The valve comprises a passageway through the side of the body and the inner wall of the housing which operates as a sealing member. When the carriage places the flexible cup against a document or envelope to be withdrawn from the stack, the valve is closed and a vacuum is formed at the cup. When the carriage places the document into the main document transport the document is pulled into the document transport which causes the body of the vacuum device to be pivoted about the pivot point. This opens the valve and quickly causes a vacuum drop at the cup. Thus, the document is released from the flexible cup without damage to the cup and is wisked away by the main document transport. The valve is then closed by means of a sring and remains closed until the document is placed into the main document transport.

OBJECTS AND ADVANTAGES

Thus, it is an object of the present invention to provide an improved document feeder mechanism which incorporates an improved vacuum cup mechanism for feeding envelopes or documents from a stack or hopper to a main transport system.

It is another object to provide a vacuum cup mechanism which eliminates solenoid valves, cams, cam sensors, and solenoid valve drivers which were used in prior art devices to release the document from the vacuum cup at the proper time. An advantage of the described invention is that it provides a vacuum cup mechanism which is less expensive to manufacture and less complex in its operation.

Another object is to provide a more reliable vaccum cup feeding mechanism which allows the document to be positively fed into the main transport system and allow more overlap into the main transport system than was heretofore possible. The advantage of this is that it reduces the possiblity of jams or dropped documents. Yet another object is to provide a vacuum cup mechanism which eliminates the need to adjust the vacuum timing depending upon the type of document or feed rate. Another advantage of the present invention is that it accommodates the changes in vacuum timing automatically.

Yet another object is to provide a vacuum cup feeder mechanism which can accommodate higher feed rates with less stress on the material being fed. A related object is to provide such a feeder which will accommodate the higher feed rates without increasing the stress on the feeder and transport mechanisms.

BRIEF DESCRIPTION OF THE DRAWINGS

Other objects and advantages of the inventions will become apparent upon reading the following detailed description and upon reference to the drawings, in which:

FIG. 1 is a perspective view of a document transport and vacuum feeding system which utilizes the inventive vacuum cup mechanism.

FIG. 2 is a top view in cross section taken along line 2—2 of FIG. 1, on an enlarged scale, and as the vacuum feeding mechanism is approaching a document.

FIG. 3 is a side view of the vacuum feeding mechanism of FIG. 2.

FIG. 4 is a top view with portions removed of the vacuum feeding mechanism as the document has been placed in the main transport system and is being released from the vacuum cup.

DESCRIPTION OF THE PREFERRED EMBODIMENT

In the illustrated embodiment there is seen a vacuum cup mechanism 10 which embodies the inventive concept. A tray or hopper 12 holds a stack 14 of envelopes or documents 16 which are to be individually withdrawn from the hopper 12. The documents 16 can be individual inserts, envelopes, or other individual sheets of paper. The documents 16 are moved to a feed end of the stack 14 by means of driven belts 17.

A carriage transport system of the type illustrated in U.S. Ser. No. 148,068 filed May 12, 1980, incorporated herein by reference, is connected by a link 18 to a carriage pivot 20. Mounted thereon is a carriage 22 which is caused to reciprocate or oscillate between the stack 14 and a main document transport 24 due to the movement of the carriage transport system. The main document transport can be of many different types. One example is gripper jaws which are used in envelope inserting machines. Belt drives or driven roller systems illustrate a second type of main document transport used on zip code sorting equipment or mail weighing devices. A characteristic of all these transport systems is that they change the speed and/or direction of the document. In the illustrated embodiment, drive rollers 26, 28 form a nip 30 between them. The rollers 26, 28 rotate in opposite directions so that when a document is placed within the nip 30, it will be driven into the main document transport 24.

Mounted to the carriage 22 is a vacuum device 32. The vacuum device 32 is seen to be comprised of a flexible vacuum cup 34 mounted on a document grasping end of the device 32. The flexbile vacuum cup 34 is mounted on a body 36 which has an upstanding shoulder 38 such that the flexible vacuum cup 34 is firmly retained thereon. At the end of the body 36 opposite the vacuum cup end, is a coupling 40 which has connected to it a flexible vacuum tube 42 connected to a suitable vacuum source (not illustrated). A regulator controls the flow rate and vacuum level through the flexible tube 42. The body 36 is supported and retained within a housing 44. A pivot pin 50 extends through the body 36 such that the body 36 can rotate about the pivot 50. The pivot pin 50 is then embedded and retained within the housing 44.

The body 36 has an internal hollow chamber 52 in fluid communication and connecting the vacuum cup 34 with the flexible vacuum tube 42. Located along the body 36 and within the housing 44 is a valve 60. The valve 60 is comprised of a passageway 62 which passes through the body 36 with one end of the passageway in fluid communication with the internal hollow chamber 52 and the other end terminating at an orifice 64 (see FIG. 2). The inner wall of housing 44 acts as a sealing member to effectively seal the orifice 64 when the two are in contact. A spring 68, with one end resting against a threaded member 70 and the other end against the body 36, forces the body to pivot about pivot pin 50 and assume the position shown in FIG. 2 with the orifice 64 sealed against the inner wall of housing 44.

In operation, the carriage transport system moves the carriage 22 towards the hopper 12 which contains the stack 14 of documents 16. The flexible vacuum cup 34 is brought in contact with the lead document 16. The vacuum from the vacuum source builds up in the system through the internal hollow chamber 52 to create a vacuum within the flexible vacuum cup 34. As the carriage 22 moves away from the stack 14, the document 16 at the front of the stack 14 is held by the vacuum cup 34.

The carriage transport system then moves the carriage 22 towards the main document transport 24. The document 16 which is held by the flexible vacuum cup 34 is positively positioned into the nip 30. As the carriage transport system moves the carriage 22 in the direction of the main document transport 24, the inertia of the carriage 22 and the body 36 act on the orifice 64 to keep it against the wall of the housing 44. This is due to the lever arm created by positioning the pivot pin 50 towards the end of the body opposite the vacuum cup end. Thus, in addition to the spring 68 forcing the orifice 64 against the housing 44 inertia aids in maintaining that seal. The force of the spring 68 against the body 36 can be varied by turning threaded member 70. This compresses or allows expansion of the spring 68 which in turn controls the amount of spring force.

As the material enters the nip 30, the drive rollers 26 and 28 are travelling at a greater surface speed than the document 16. The document accelerates which causes the body 36 to pivot around pivot pin 50 as illustrated in FIG. 4. This causes the passageway 62 and orifice 64 to open with respect to the inner wall of housing 44 and vent the hollow chamber 56 and vacuum cup 34 to the atmosphere. The cross sectional area of the passageway 62 and orifice 64 is designed to be sufficiently large enough to permit the vacuum in the flexible vacuum cup 34 to drop essentially to zero in a relatively short time. The document 16 is thereby released from the flexible vacuum cup 34. The release is such that very little abrasion occurs at the flexible cup 34 which results in minimum wear to the cup 34. After the document 16 is swept into the main transport 24, the carriage transport system moves the carriage 22 back towards the stack 14 to initiate a new cycle.

The above described invention was designed for an application wherein the vacuum device 32 was the only device connected to the vacuum source. Thus, the need to maintain a vacuum in the line 42 was not present. However, in other alternate embodiments, such as in inserting machines, several vacuum devices might be connected to a single vacuum source and it becomes necessary to be able to maintain the vacuum in the line 42.

These cases would require the placement of a restriction 54 in the hollow internal chamber 52 or alternately in the line 42 as shown by restriction 56. The restriction must be placed between the vacuum source and the orifice 64. This would permit the vacuum at the vacuum cup 34 to be reduced to substantially zero when the orifice 64 is opened, while still maintaining a vacuum in the line 42. The cross sectional area of the passageway 62 and orifice 64 is designed to be larger than the cross sectional area of the restriction 54 or 56. If the restriction 54 is placed in the hollow chamber 52 it divides the chamber 52 into an upper chamber 57 and a lower chamber 58.

Thus, it can be seen that regardless of the feed rate of the carriage transport system, no external timing of the release of the vacuum at the flexible cup 34 is required. The system automatically compensates for such changes in feed rate. Also, for systems using pullout rollers, material or documents of greater thickness will be picked up by the rollers 26, 28 before thinner material which causes further problems in accurately setting the timing for venting the vacuum to the cup 34. With the present invention, such timing changes do not have to be calculated or set by means of the cams, solenoids, and valves which have heretofore been commonly used.

Thus it is apparent that there has been provided, in accordance with the invention, a vacuum document feeder and vacuum cup mechanism that fully satisfies the objects, aims, and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A vacuum device for feeding documents from a stack to a document transport comprising:
   a flexible cup at one end of the vacuum device,
   a body with an internal hollow chamber in fluid communication with the flexible cup,
   means for providing a vacuum at the other end of the vacuum device in fluid communication with the hollow chamber,
   pivot means for providing a pivot point about which the body can rotate,
   valve means having a passageway passing through the body with one end of the passageway in fluid communication with the internal hollow chamber and the other end of the passageway terminating at an orifice in the body and sealing means for opening or closing the orifice as the body pivots about the pivot means, the valve means operated responsive to the document transport pulling the document away from the flexible cup causing the body to pivot about the pivot means,
   the valve means serving as means for creating a vacuum at the flexible cup when a document is to be withdrawn from the stack and destroying the vacuum at the flexible cup when the document is pulled away by the document transport and thereby selectively retaining and releasing documents in response to the pivoting of the body.

2. The device of claim 1 wherein the sealing means is stationary with respect to the pivot means and the pivoting of the body causes the orifice to contact or separate from the sealing means.

3. The device of claim 2 and further comprising spring means for exerting a force on the body causing the body to pivot thereby normally closing the orifice against the sealing means.

4. The device of claim 3 and further comprising means for moving the document when the document is held by the vacuum device thereby causing the body to rotate and open the valve means and reducing the vacuum at the cup.

5. The device of claim 4 wherein the means for moving the document comprises a pair of feed rollers defining a nip between them, the feed rollers rotating with a surface speed greater than the speed of the document.

6. The device of claim 1 wherein the one end of the passageway is connected to the internal hollow chamber and the other end of the passageway is vented to atmospheric pressure when the orifice is not sealed by the sealing means.

7. The device of claim 6 and further comprising a restriction dividing the internal hollow chamber into a upper and lower chamber, the upper chamber in direct fluid communication with the flexible cup and the passageway, and the lower chamber connected to the vacuum source.

8. The device of claim 7 wherein the means for providing a vacuum provides a continuous vacuum to the lower chamber, and draws a vacuum in the upper chamber through the restriction, the restriction controlling the rate at which the vacuum is drawn from the upper chamber.

9. The device of claim 8 whrein the cross sectional area of the restriction is less than the cross sectional areas of the passageway, whereby the rate of vacuum withdrawal from the upper chamber through the restriction is less than the rate of venting or vacuum destruction through the passageway when the orifice is opened, resulting in such a decrease in the vacuum at the flexible cup that the document is released.

10. A vacuum feeding mechanism for removing documents from a stack and placing them into a document transport comprising:
   a carriage transport system oscillating between the stack and the document transport means;
   a carriage connected to the carriage transport system;
   a vacuum device mounted on the carriage, the vacuum device comprising:
   a flexible cup at one end of the vacuum device,
   a body with an internal hollow chamber in fluid communication with the flexible cup,
   a vacuum source in fluid communication with the body to provide a vacuum within the internal hollow chamber, pivot means for providing a pivot point about which the body can pivot, and valve means having a passageway passing through the body with one end of the passageway in fluid communication with the internal hollow chamber and the other end of the passagway terminating at an orifice in the body, and sealing means for opening or closing the orifice as the body pivots about the pivot means, the valve means operated responsive to the document transport forcing the document away from the flexible cup, causing the body to pivot about the pivot means thereby opening the orifice; and the valve means serving as means for selectively causing a vacuum at the flexible cup when the cup contacts a document at the stack and causing a release of the vacuum at the flexible cup when the document is moved into the document transport means.

11. The mechanism of claim 10 wherein the sealing means is stationary relative to the pivot means and the pivoting of the body causes the orifice to contact or separate from the sealing means.

12. The mechanism of claim 11 and further comprising spring means for exerting a force on the body to cause the body to pivot thereby normally closing the orifice against the sealing means.

13. The mechanism of claim 10 wherein the one end of the passageway is connected to the upper chamber and the other end of the passageway is vented to atmospheric pressure when the orifice is not sealed by the sealing means.

14. The mechanism of claim 13 and further comprising a restriction within the internal hollow chamber, the restriction dividing the internal hollow chamber into an upper and lower chamber, the upper chamber in direct fluid communication with the flexible cup and the passageway and the lower chamber connected to the vacuum source.

15. The mechanism of claim 14 wherein the vacuum source provides a continuous vacuum to the lower chamber, and draws a vacuum in the upper chamber through the restriction, the restriction controlling the rate at which the vacuum is drawn from the upper chamber.

16. The mechanism of claim 14 wherein the cross sectional area of the restriction is less than the cross sectional area of the passageway, whereby the rate of vacuum withdrawal from the upper chamber through the restriction is less than the rate of venting or vacuum destruction through the passageway when the orifice is opened, resulting in such a decrease in the vacuum at the flexible cup that the document is released when the document is forced away by the document transport means.

* * * * *